(12) United States Patent
Kim

(10) Patent No.: US 6,643,606 B2
(45) Date of Patent: Nov. 4, 2003

(54) APPARATUS FOR MEASURING ABSOLUTE ROTATION ANGLE AND METHOD THEREOF

(75) Inventor: Yong-Tea Kim, Yongin-shi (KR)

(73) Assignee: Samsung Thales Co., Ltd. (KR)

( * ) Notice: Subject to any disclaimer, the term of this patent is extended or adjusted under 35 U.S.C. 154(b) by 0 days.

(21) Appl. No.: 09/935,742

(22) Filed: Aug. 23, 2001

(65) Prior Publication Data

US 2002/0087288 A1 Jul. 4, 2002

(30) Foreign Application Priority Data

Dec. 30, 2000 (KR) ........................................ 2000-87187

(51) Int. Cl.[7] .................. G01C 17/00; G01C 19/00; G01C 9/00; G06F 15/00
(52) U.S. Cl. ...................................... 702/151; 318/661
(58) Field of Search ............................ 702/151; 318/661

(56) References Cited

U.S. PATENT DOCUMENTS

| | | | | |
|---|---|---|---|---|
| 4,134,106 A | * | 1/1979 | Hungerford | 341/116 |
| 4,270,077 A | * | 5/1981 | Swartz et al. | 318/661 |
| 4,320,391 A | * | 3/1982 | Mallett | 341/117 |
| 4,334,179 A | * | 6/1982 | Grimes et al. | 318/661 |
| 4,972,186 A | * | 11/1990 | Morris | 340/870.25 |
| 5,162,798 A | * | 11/1992 | Yundt | 341/116 |

* cited by examiner

Primary Examiner—John Barlow
Assistant Examiner—Anthony Dougherty
(74) Attorney, Agent, or Firm—Dilworth & Barrese LLP

(57) ABSTRACT

Disclosed is an apparatus for measuring an absolute rotation angle and a method thereof. In particular, the apparatus is available for a measurement and servo system in which high precision is required in rotation drive and absolute rotation angle measurement. The apparatus comprises a rotation mechanism having a driver rotating unit connected to a resolver, a driver fixing unit coupled to the driver rotating unit and a sensor for detecting a rotating state of the driver rotating unit; an actuator unit for driving the rotation mechanism in response to a rotation control; a resolver interface for converting a rotation detection signal from the resolver to a digital resolve data; and a controller for providing the rotation control signal to the actuator unit, receives the digital resolver data and the rotation detection signal to set the initial rotation reference position of the rotation mechanism, and compensates a rotation angle when the digital resolver data changes abruptly in respect to the initial rotation reference position to calculate an absolute rotation angle.

6 Claims, 6 Drawing Sheets

APPARATUS FOR MEASURING ABSOLUTE ROTATION ANGLE AND METHOD THEREOF

PRIORITY

This application claims priority to an application entitled "APPARATUS FOR MEASURING ABSOLUTE ANGLE AND METHOD THEREOF" applied with the Korean Industrial Property Office on Dec. 30, 2000 and assigned Serial No. 2000-87187, the contents of which is hereby incorporated by reference.

BACKGROUND OF THE INVENTION

1. Field of the Invention

The invention relates to an apparatus for measuring an absolute rotation angle and a method thereof. In particular, the measuring apparatus is available for a measurement and servo system in which high precision is required in rotation drive and absolute rotation angle measurement.

2. Description of the Related Art

In a number of measuring and servo systems for performing rotation drive, higher precision has been required in rotation drive and absolute rotation angle measurement. Also, in the most cases of this rotation drive system, it is being required to carry out absolute rotation angle measurement in real time. At the present, a rotation angle sensor, which measures a relative or absolute rotation angle according to a measured rotation angle, includes an encoder, a resolver, a synchro and the like. Lately, a multi-speed resolver is frequently used for improving precision. However, in measuring the rotation angle by using the multi-speed resolver and a normal RDC (Resolver to Digital Converter), an absolute rotation angle can be measured within a limited angle, whereas only the relative rotation angle can be obtained beyond the range of the limited angle as a problem.

FIG. 1 shows a structure of a general resolver, and FIG. 2 shows input-output signals of a general resolver and digital outputs from an RDC.

Referring to FIG. 1, the resolver has one rotor 12 and two stators 14 and 16. When the rotor 12 is energized with an AC square wave as shown in FIG. 2, sine and cosine signals are obtained from the stators 14 and 16. In the one-speed resolver as shown in FIG. 1, the absolute rotation angle can be measured easily by using the RDC which digitalizes the outputs of the resolver. On the other hand, the multi-speed resolver, for example a two-speed resolver has relatively high precision. However, the multi-speed resolver has output waveforms like two-speed outputs E1 and E2 as shown in FIG. 2. Accordingly, the relative rotation angle cannot be obtained beyond the limited angle while the value of the absolute rotation angle is provided within the limited angle.

SUMMARY OF THE INVENTION

It is therefore an object of the present invention to provide an apparatus and method available for a digital measurement and servo system for measuring the value of an absolute rotation angle very precisely.

According to an embodiment of the invention to obtain the object, it is provided an apparatus for measuring an absolute rotation angle, comprising: a rotation mechanism having a driver rotating unit connected to a resolver, a driver fixing unit coupled to the driver rotating unit and a sensor for detecting a rotating state of the driver rotating unit; an actuator unit for driving the rotation mechanism in response to a rotation control; a resolver interface for converting a rotation detection signal from the resolver to a digital resolve data; and a controller for providing the rotation control signal to the actuator unit, receives the digital resolver data and the rotation detection signal to set the initial rotation reference position of the rotation mechanism, and compensates a rotation angle when the digital resolver data changes abruptly in respect to the initial rotation reference position to calculate an absolute rotation angle.

DETAILED DESCRIPTION OF THE PREFERRED EMBODIMENT

Hereinafter, it will be described about a measuring apparatus for absolute rotation angle and a method thereof according to a preferred embodiment of the invention. Also, specific elements about a structure according to the embodiment of the invention will be described in detail to provide a more thorough understanding of the invention in the following specification. However, it will be apparent to those skilled in the art that the invention can be made without these specific elements.

Figure 3:
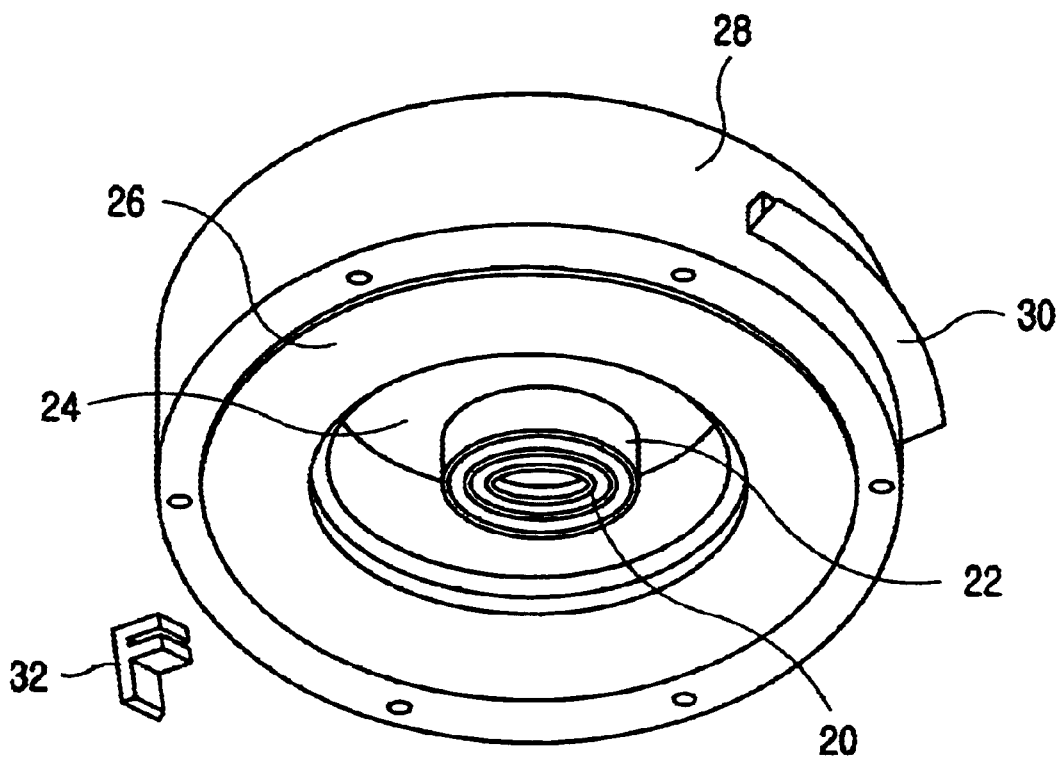
FIG. 3 shows a measuring apparatus for absolute rotation angle according to an embodiment of the invention.

FIG. 3 shows a measuring apparatus for absolute rotation angle according to the embodiment of the invention, which is provided as a mechanism coupled to a rotating section of a resolver for detecting an absolute rotating state of the resolver.

Referring to FIG. 3, the apparatus is provided with an driver fixing section 26 having a hollow or concavity for fixing a rotated mechanism, a driver rotating section 28 having a rotary axis 24 placed within the concavity of the driver rotating section and which is attached to rotate with the driven rotating section, and a resolver rotating section 20 rotationally coupled to the lower part of the rotation axis 24 and having a resolver fixing section 22 attached thereto for fixing the resolver. Also, a projection piece 30 is attached to one side of the driver rotating section 28, and an optical switch 32 is fixedly attached to a portion where the driver fixing section 26 is fixed.

The mechanism having the foregoing configuration detects the rotation of the driver rotating section 28 to obtain an absolute position, and uses the resolver to detect a relative rotation angle. Here, the size of an optical switch mechanism should be set by fixing a pole pair of a multi-speed resolver.

Figure 4:
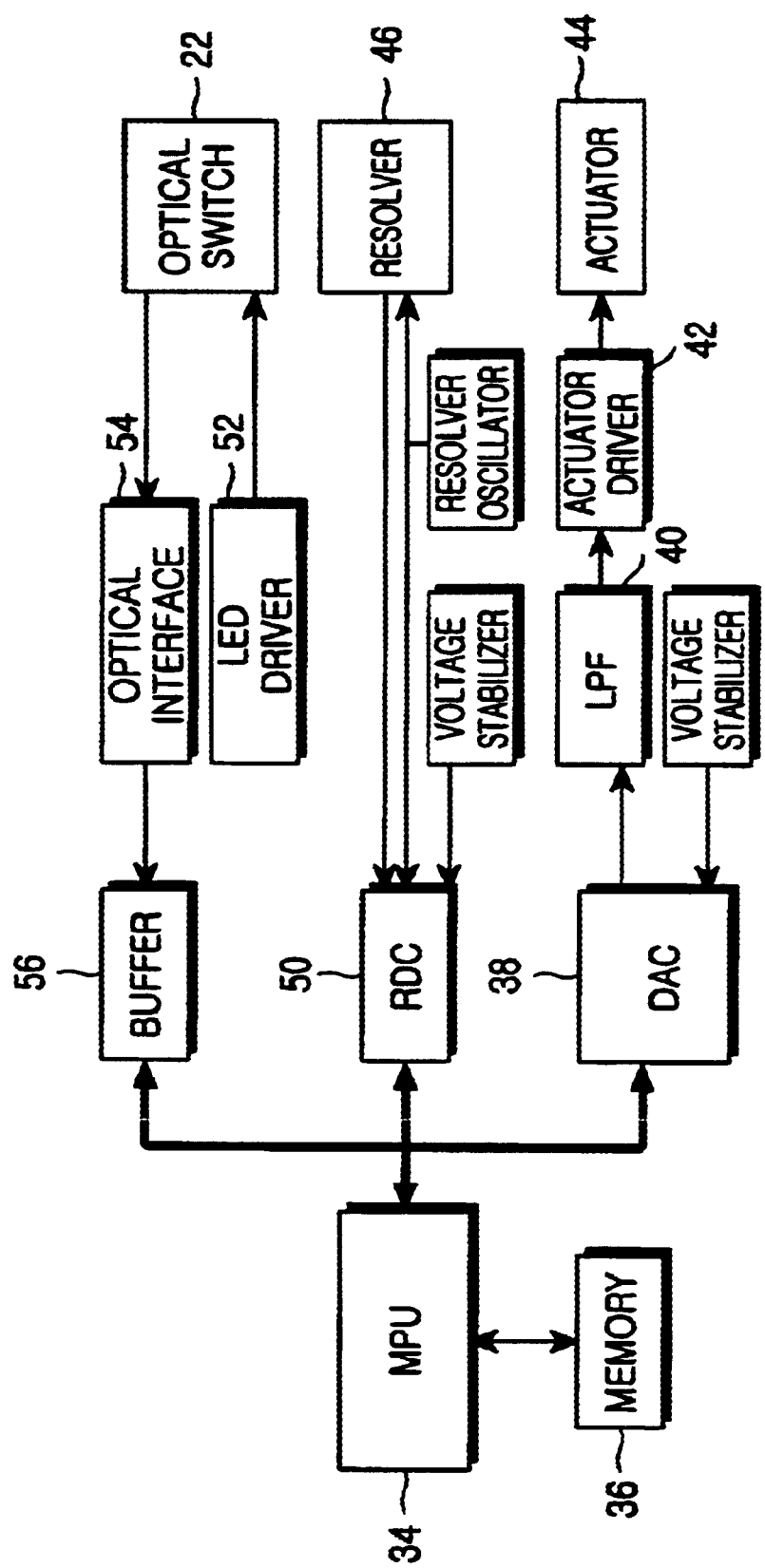
FIG. 4 is an electronic circuit block diagram of a measuring apparatus for absolute rotation angle according to the embodiment of the invention.

FIG. 4 shows the measuring apparatus for absolute rotation angle according to the embodiment of the invention, which is provided as an electronic circuit for controlling the optical switch 22 and the mechanism shown in FIG. 3 and for obtaining absolute and relative angles by detecting an output of the resolver. Such an apparatus is mainly comprised of a control unit, a resolver interface, an optical switch interface and a drive unit. Here, the control unit is comprised of a processor or controller 34 composed of a microprocessor unit (MPU) or a digital signal processor (DSP) and a memory 36. The drive unit is comprised of a DAC (Digital to Analog Converter) 38, a low-pass filter (LPF) 40, an actuator driver 42 and an actuator 44. The resolver interface is comprised of a resolver 46, a resolver oscillator, a Resolver to Digital Converter (RDC) 50 and a voltage stabilizer for the RDC. The optical switch interface is comprised of an LED driver 52 for driving light emitting diodes (LEDs) in the optical switch 22, an optical interface 54 for matching an output of the optical switch, and a buffer 56.

Figure 5:
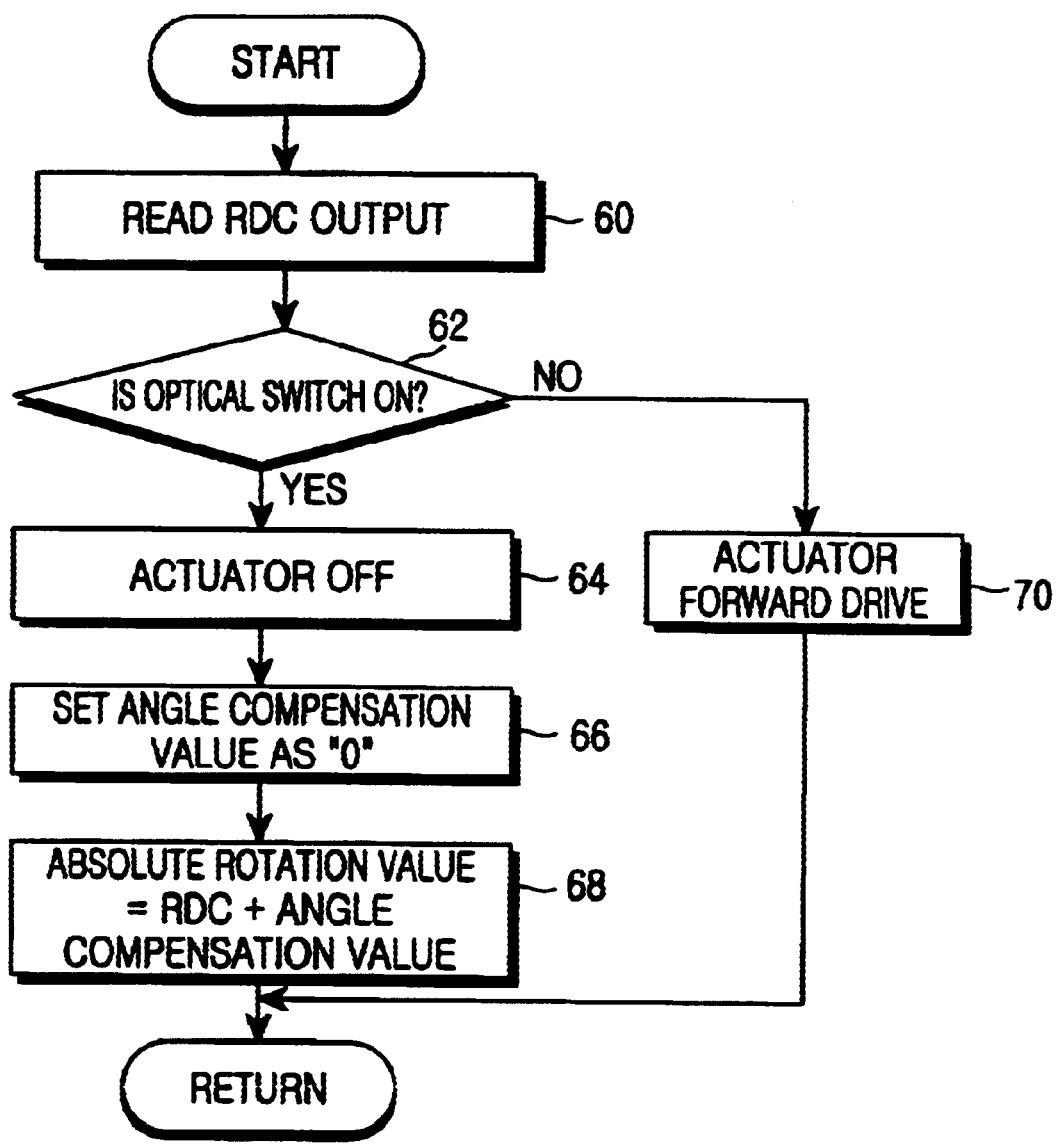
FIG. 5 and FIG. 6 are flow charts for controlling the operation of a controller shown in FIG. 4.
Figure 6:
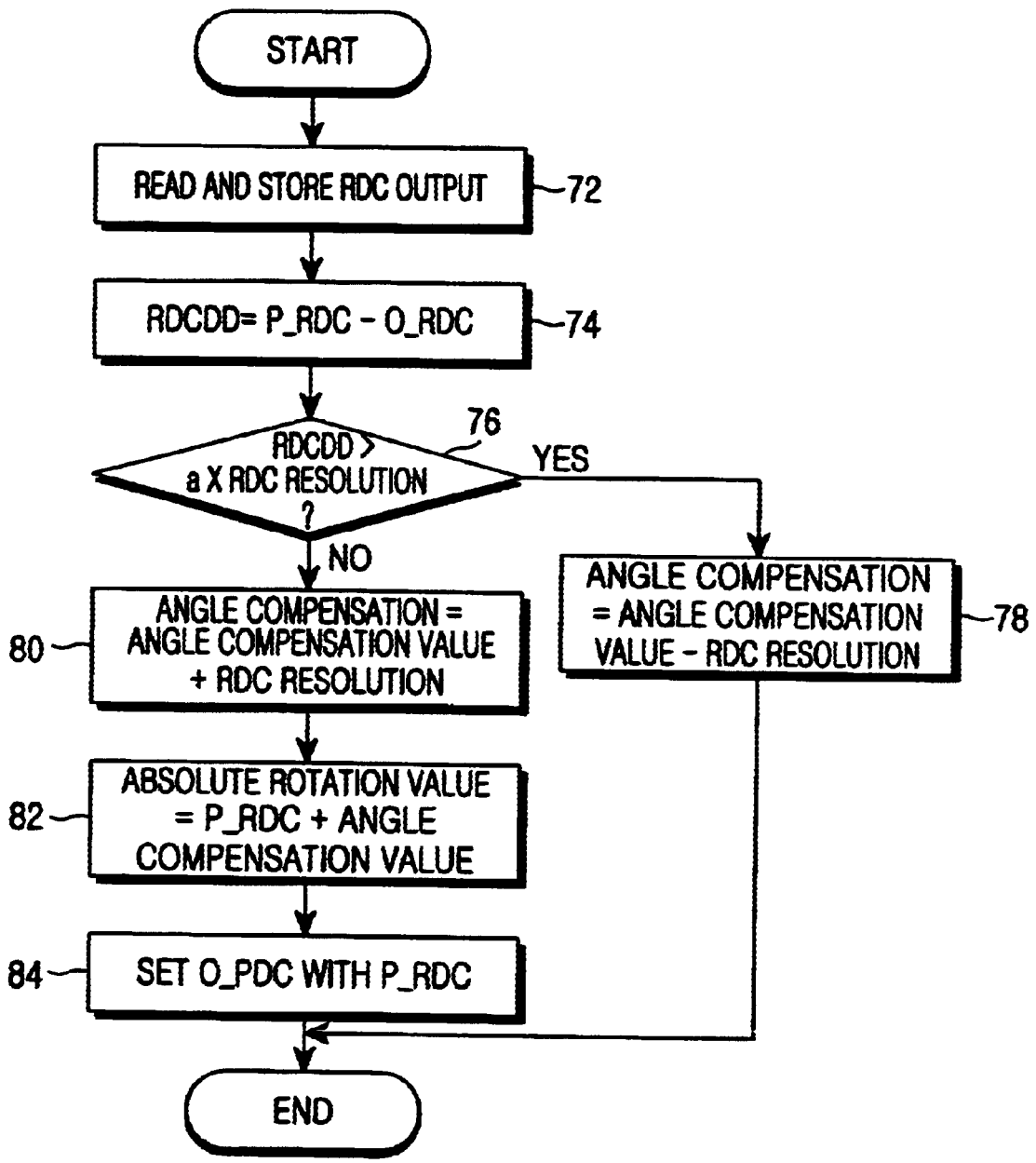

FIG. 5 and FIG. 6 show algorithms for controlling the operation of the controller 34 shown in FIG. 4, in which FIG. 5 is a flow chart for setting the initial absolute position, and FIG. 6 is a flow chart for calculating an absolute rotation angle.

Hereinafter, detailed description will be about the operation of the measuring apparatus for absolute rotation angle according to the invention in reference to FIG. 3 to FIG. 6.

Figure 1:
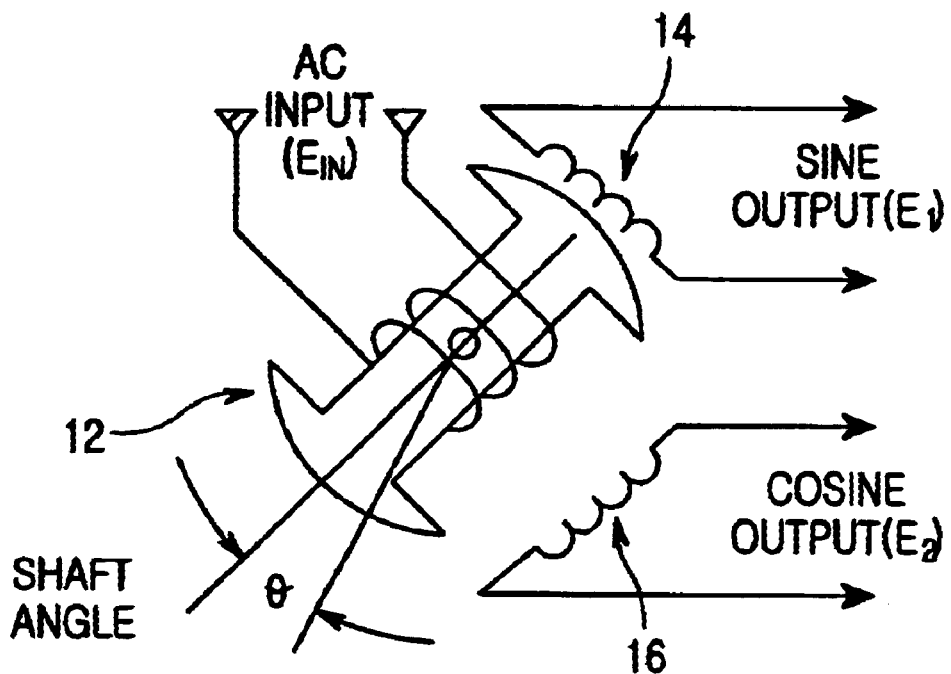
FIG. 1 shows a structure of a general resolver.
Figure 2:
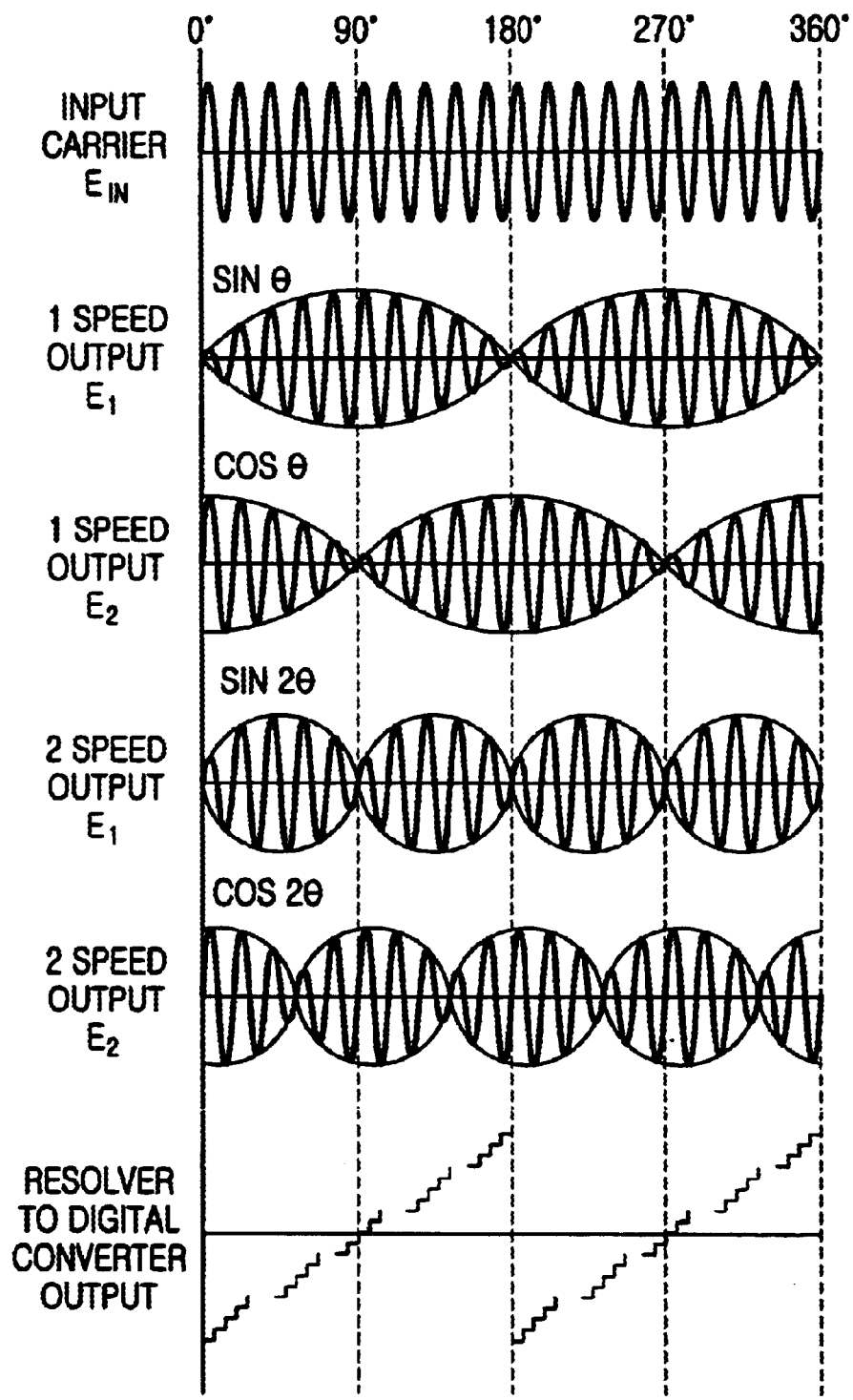
FIG. 2 shows input-output signals of a general resolver and digital outputs of an RDC.

When the measuring apparatus for absolute rotation angle configured as shown in FIG. 4 is operated, the controller 34 outputs a control data to the DAC 38 for driving the driver shown in FIG. 3. Here, the DAC 38 converts the drive control data into analog signals and supplies the same to the LPF 40, and the LPF 40 low-pass filters the converted analog signals to provide them to the actuator driver 42. The actuator driver 42 drives the actuator 44 according to the voltage of the filtered signal to rotate the driver rotating section 28 as shown in FIG. 3. Here, the resolver oscillator generates a resolver driving signal as mentioned in reference to FIG. 2 and supplies the same to the resolver 46, and the LED driver 52 drives the LEDs in the optical switch 32.

When the driver rotating section 28 is rotated, the projection piece 30 attached to a side thereof passes the optical switch 32 on every rotation of about 360, and the resolver rotating section 20 is rotated to rotate the rotor within the resolver 46. Thus, a multi-speed output is generated from the plurality of stators in the resolver 46 as mentioned in reference to FIG. 2, and supplied to the RDC 50. A rotation detection signal of the driver rotating section 28 is inputted to the buffer 56 via the optical switch interface 54.

The RDC 50 converts the multi-speed detection signal from the resolver and supplies the converted signal to the controller 34, the buffer 56 supplies the output of the optical switch 32 to the controller 34. Here, the controller 34 analyzes an on/off detection signal of the optical switch 32 outputted from the buffer 56 and an output from the RDC 50 to set the initial position and calculates the value of the absolute rotation angle. Such setting of the initial absolute position and calculation of the absolute rotation angle value will be understood more clearly from the following description.

As shown in FIG. 5, the controller 34 reads the output from the RDC 50 in step 60 and reads the output from the buffer 56 in step 62 to judge if the optical switch 32 is "ON" If the optical switch is judged "OFF" in step 62, the controller 34 outputs the drive control data to the DAC 38 to drive the actuator 44 forward (step 70). If the optical switch 32 is "ON", the controller 34 interrupts the output of the drive control data to turn off the actuator 44 in step 64. In other words, the driven actuator 44 is stopped in a position where the projection piece 30 is detected by the optical switch 32, and the controller 34 sets an angle compensation value as "0." (step 66). In step 68, the controller adds the angle compensation value to the output data of the RDC 50, and sets the added value as the absolute rotation angle value.

As can be seen hereinbefore, the driver shown in FIG. 3 is slowly driven into one direction, in which the value of the resolver is set as the reference value of the initial value of the rotation angle at the moment that the optical switch is on.

The controller 34 sets the initial position according to a control process as can be seen in FIG. 5, and calculates the absolute rotation angle value of the rotation driver as follows.

The calculation of the absolute rotation angle is initiated when the controller 34 reads the output from the RDC 50 to store the output in an internal memory in step 72 of FIG. 6. Upon reading the output from the RDC 50, the controller 34 subtracts the old RDC data (O_RDC) previously stored in the internal memory from the present RDC data (P_RDC) read in the present RDC 50 to calculate the RDC data difference (RDCDD) in step 74 shown in FIG. 6.

The controller 34 judges if the RDC data difference (RDCDD) is larger than a multiplication of an RDC resolution by a coefficient a, which is set as an approximate value of 1 and has a value of about 0.7 to 0.8. (See step 76 of FIG. 6.) If the RDC data difference or RDCDD is larger than the multiplication of the coefficient a by the RDC resolution, the controller 34 sets a subtracted value of the angle compensation value minus the RDC resolution as the angle compensation value by which to compensate the angle. (See step 78.)

If it is judged that the RDCDD is smaller than the multiplication of the coefficient a by the RDC resolution, the controller 34 adds the RDC resolution to the previously set angle compensation value to compensate the angle in step 80. After performing step 80, the controller 34 adds the angle compensation value to the present RDC data (P_RDC) read in the present RDC 50 to calculate the absolute rotation angle in step 82. In step 84, the controller 34 replaces the old RDC data (O_RDC) that is stored in the memory with the present RDC data (P_RDC) read in the present RDC 50, terminating the calculation of the absolute rotation angle.

Therefore, when the output of the RDC 50 changes in respect to the initial rotation reference point or reference value, the rotation angle is compared to the absolute rotation angle, allowing the absolute rotation angle to be calculated correctly.

According to the invention described hereinbefore, the rotation state of the driving unit is detected to set the initial absolute position and, when the RDC output is abruptly changed in respect to the initial rotation reference point, the angle is compensated for the measurement of the absolute rotation angle. Thus, the rotation angle can be measured with high precision in the continuously rotating system. Also, the absolute rotation angle can be measured easily by using the multi-speed resolver.

What is claimed is:

1. An apparatus for measuring an absolute rotation angle, comprising:

a rotation mechanism having a driver rotating unit connected to a resolver, and including a projection piece attached to a side of said driver rotating unit, said rotation mechanism further having a driver fixing unit, rotationally coupled to said driver rotating unit and a sensor for detecting a rotating state of said driver rotating unit; said sensor being fixedly attached to a portion where said driver fixing unit is fixed for detecting a passage of said projection piece;

an actuator unit for driving said rotation mechanism in response to a rotation control signal;

a resolver interface for converting a rotation detection signal from the resolver to a digital resolver data; and a controller for providing said rotation control signal to said actuator unit, for receiving said digital resolver data and the rotation detection signal to set an initial rotation reference position of said rotation mechanism, and for calculating said absolute rotation angle when the digital resolver data changes.

2. An apparatus for measuring an absolute rotation angle according to claim 1, wherein said driver rotating unit rotates about a rotary axis, and said rotary axis is affixed within the concavity of the driver rotating unit; and wherein said driver rotating unit further comprises a resolver fixing unit having a resolver rotating section coupled to a lower part of said rotary axis for fixing the resolver.

3. An apparatus for measuring an absolute rotation angle according to claim 1, wherein said sensor is an optical switch.

4. An apparatus for measuring an absolute rotation angle according to claim 3, wherein further comprising a Light Emitting Diode (LED) driver for driving LEDs of said optical switch, and an optical interface for supplying a signal from said optical switch.

5. An apparatus for measuring an absolute rotation angle according to claim 1, wherein said actuator unit comprises a converter for converting the rotation control signal from said controller to an analog signal, a low pass filter for filtering the converted analog signal and an actuator for rotating said driver rotating unit of said rotation mechanism in response to the filtered signal.

6. An apparatus for measuring an absolute rotation angle according to claim 1, wherein said resolver interface comprises a resolver oscillator for supplying a square wave to rotators in said resolver, and a converter for digitizing an analog wave from the rotators in said resolver to supply the digitized wave to said controller.

* * * * *